United States Patent

Gottwald et al.

[11] Patent Number: 5,219,581
[45] Date of Patent: Jun. 15, 1993

[54] COOLING DEVICE FOR A BLOW EXTRUDER

[75] Inventors: Günter Gottwald, Nürnberg; Gérard Schaeffer, Worms, both of Fed. Rep. of Germany

[73] Assignees: Sulzer Escher Wyss GmbH, Lindau/Bodensee; Paul Kiefel GmbH, Cornelius-Heyl, both of Fed. Rep. of Germany

[21] Appl. No.: 780,134

[22] Filed: Oct. 21, 1991

[30] Foreign Application Priority Data

Oct. 20, 1990 [DE] Fed. Rep. of Germany ....... 4033461

[51] Int. Cl.⁵ .............................................. B29C 47/86
[52] U.S. Cl. ................. 425/72.1; 62/259.1; 425/143
[58] Field of Search ................ 425/72.1, 326.1, 387.1, 425/143; 264/569, 565; 62/259.1

[56] References Cited

U.S. PATENT DOCUMENTS

| | | | |
|---|---|---|---|
| 3,847,516 | 11/1974 | Hoffman | 425/72.1 |
| 4,022,558 | 5/1977 | Herrington | 425/72.1 |
| 4,115,047 | 9/1978 | Stelmack | 425/72.1 |
| 4,373,273 | 2/1983 | Church | 425/326.1 X |
| 4,447,387 | 5/1984 | Blakeslee, III et al. | 264/569 X |
| 4,606,879 | 8/1986 | Cerisano | 425/326.1 X |
| 4,626,397 | 12/1986 | Bose | 264/565 |
| 4,938,903 | 7/1990 | Schaeffer et al. | 425/72.1 X |

FOREIGN PATENT DOCUMENTS

| | | | |
|---|---|---|---|
| 2737037 | 3/1979 | Fed. Rep. of Germany | 425/72.1 |
| 47-4147 | 2/1972 | Japan | 425/72.1 |
| 58-57923 | 4/1983 | Japan | 425/72.1 |

Primary Examiner—Richard L. Chiesa
Attorney, Agent, or Firm—Anderson Kill Olick & Oshinsky

[57] ABSTRACT

A blow extruder for producing hoses made of plastic material has, at the outlet of its nozzle arrangement for producing hoses, a cooling air nozzle ring which encompasses hoses exiting from the nozzle arrangement and to which air is delivered from a blower. An apparatus for cooling air delivered to the cooling air nozzle ring includes a direct evaporator provided with a refrigeration plant and arranged between the blower and the cooling air nozzle ring. The direct evaporator includes a plate fin element and an injection device for a cooling agent and hot air. The cooling apparatus further includes a regulation device for controlling the temperature of the cooling air by controlling operation of the cooling apparatus.

3 Claims, 2 Drawing Sheets

COOLING DEVICE FOR A BLOW EXTRUDER

BACKGROUND OF THE INVENTION

The invention is directed to a cooling apparatus for cooling air of a blow-type extruder for a plastic material hose in which an annularly-shaped set of nozzles for the plastic material hose is connected to a plastic material supply device and is arranged coaxially to an internal air arrangement. The cooling apparatus comprises a cooling air nozzle ring is assigned coaxially to the set of nozzles and embracing the hose, with a blower supplying ambient air to the cooling air nozzle ring. The cooling apparatus is located in the conveyance path of the blower and is provided with a device for regulating the temperature of the cooling air to a set-up constant temperature in comparison with a measured temperature.

In a blow-type extruder for a plastic material hose a plastic material supply arrangement conveys liquified material to an annularly-shaped set of nozzles, which delivers the plastic material hose from an internal annularly closed slotted die, by hose with a horizontal arrangement of the set of nozzles or dies is conveyed away vertically. An internal- or auxiliary air arrangement is provided on the side of the set of nozzles facing away from the hose, which presses air into the hose in order to prevent same from collapsing or hold same in the expanded state. A pair of rollers is provided spaced from the set of nozzles or dies, which keep the hose closed at the end remote from the set of nozzles and conveys the hose away. The set of nozzles or dies is provided with a cooling air blowing ring at the side facing away from the internal air arrangement, from which air impinges upon the hose which leaves the slotted nozzle in the almost liquid state, in order to cool and solidify the hose material in an expeditious manner. The ambient air is for instance environmental air of a manufacturing hall or external air from outside of the manufacturing hall and is at a fluctuating and often too high a temperature. If this ambient air is blown for cooling purposes on the solidifying hose, then the finished hose comprises fluctuating and unstable properties along its length.

Because non-conditioned ambient air with a high and fluctuating temperature badly suits for cooling the hose, it can be envisaged to provide a cooling device with its own ventilator or fan which device itself aspirates and cools the ambient air. The blower aspirates the cooled ambient air. With such a proposal, the cooling device can be formed as a water-cooling device. A water-cooling device can not be controlled accurately to a specific temperature of the cooling air and permits only a minimum temperature of the cooling air of, for instance, 15° C. Since the cooled air passes through the blower which produces heat, it should be cooled down to such an extent that it can absorb the heat produced in the the blower. In the proposal, the regulation can be accomplished as a function of the temperature of the air flowing towards the blower.

SUMMARY OF THE INVENTION

It is therefore one object of the invention to provide a cooling device of the previously described type, which assures constant conditioning of the cooling air in an improved manner and permits to achieve lower temperatures of the cooling air in a simple way. The cooling device according to the invention is characterized in that in order to achieve this object, it is arranged between the blower and the cooling air nozzle ring and comprises a direct evaporator provided with a refrigeration plant, which evaporator comprises a plate fin portion and an injection arrangement for the refrigeration agent and hot air. Temperature measured at the entry into the cooling air nozzle ring is assigned to the regulation device of the direct evaporator.

By using the per se known direct evaporator the cooling air can be cooled to temperatures below 15° C., down to 3° C. By using the direct evaporator, a faster, more accurate regulation to a constant temperature is assured. Since it is possible to add hot gas to the direct evaporator, even an ambient temperature of less than 3° C. can be dealt with, meaning the cooling device is a temperature-conditioning device. The air leaving the cooling device is no longer heated by the heat emitted by the blower. The regulation of the temperature is tuned to the temperature measured at the inlet into the cooling air-nozzle ring, which temperature is essentially equal to the temperature of the cooling air. This measure very noticeably improves the quality of the fabricated plastic material hose and is kept high and/or constant. For instance a hose can be produced whose thickness is rigorously constant across the length. Because of the rigorously constant blow-in temperature of for instance 15°–18° C., the hot extruded plastic material can be fed or conveyed away faster and more uniformly. It was shown, that the influence of the cooling air is of considerable significance on the function and the output of the blow-type extruder. Increases in output of approximately 10% were observed.

It is especially appropriate and advantageous if the cooling device is provided at its inlet union with a filter for removal of air contamination. This filter protects the direct evaporator against deposits and assures a constant functional mode of the direct evaporator over long time periods.

In certain circumstances, it is necessary, to equip the direct evaporator with an additional auxiliary ventilator or fan, this if the blower is not sufficiently powerful. It is however especially appropriate and advantageous, if the direct evaporator is devoid of a ventilator or an additional blower. This simplifies the structure of the direct evaporator and also avoids the waste of heat that would have been emitted by an auxiliary ventilator.

BRIEF DESCRIPTION OF THE DRAWINGS

The drawing shows a preferred embodiment of the invention; in the drawings.

DETAILED DESCRIPTION OF THE PREFERRED EMBODIMENT

Figure 1:
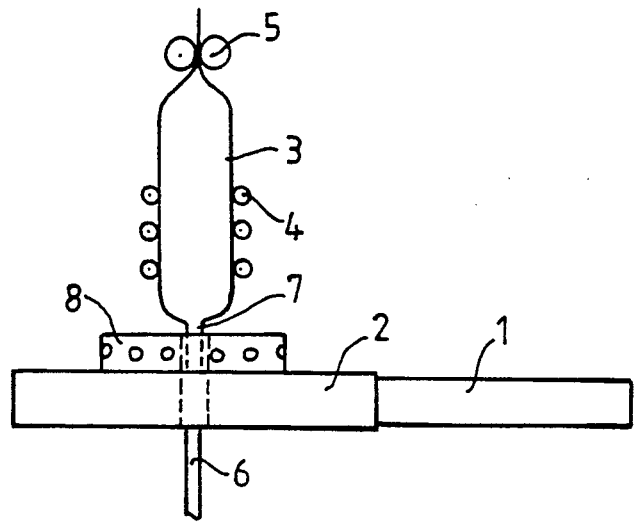
FIG. 1 shows a diagrammatic side view of a blow-type extruder.

The blow-type extruder in FIG. 1 comprises a plastic material feeding arrangement 1, which melts and intermixes the plastic material which is in granulated form and feeds the liquid plastic material to an annularly-shaped nozzle or die aggregate 2. The nozzle aggregate 2 produces inside of the annulus a film or foil 7 of plastic material having an annularly-shaped cross-section, which migrates vertically upwards in the shape of a plastic material hose 3. The plastic material hose 3 is guided on the sides by backup rollers 4 and is folded together at the top by a pair of rolls 5 and is conveyed further. Air is pressed into the hose 3 from the bottom by means of an internal air arrangement 6, in order to widen same and keep it open. The region of the just-produced annularly-shaped film 7 is surrounded by a cooling air nozzle ring 8, which blows cooling air against the annularly-shaped film or foil.

Figure 2:
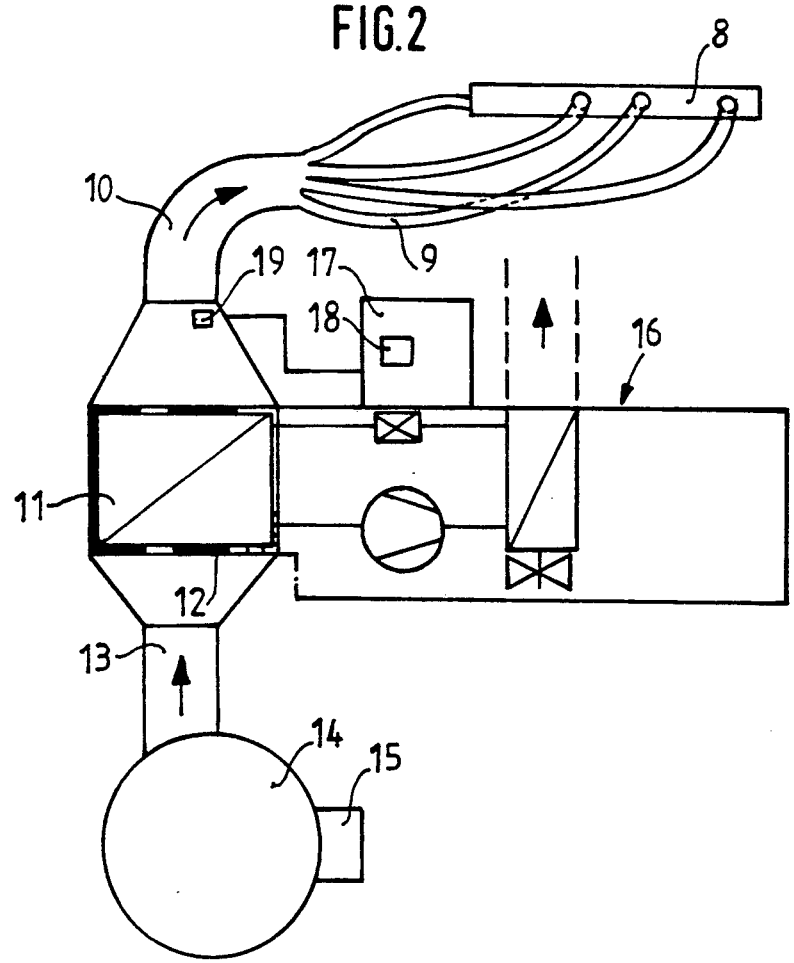
FIG. 2 shows a diagrammatic side view of a cooling apparatus for the blow-type extruder in FIG. 1

According to FIG. 2, hose liens 9 are connected to the cooling air nozzle ring 8 so as to be distributed across its circumference, which hoses branch out from an outlet tube 10 located at the output of a direct evaporator 11. A filter 12 is provided at the inlet of the direct evaporator 11 and is connected to an intermediate tube 13 into which a blower 14 discharges. The blower 14 aspirates non-conditioned ambient air through a union 15. The direct evaporator 11 is provided with a refrigeration plant 16 which is shown in detail in FIG. 3. The direct evaporator 11 or its refrigeration plant 16 is provided with a regulation device 17, which controls the refrigeration plant or the direct evaporator and which includes an actuator 18 permitting to adjust a specific desired temperature at the outlet of the direct evaporator 11 as a nominal value and which regulation device 17 comprises a nominal value/actual value comparison. A temperature sensor 19 located at the outlet of the direct evaporator supplies the actually existing temperature, (actual or feedback temperature) to the regulation device 17.

Figure 3:
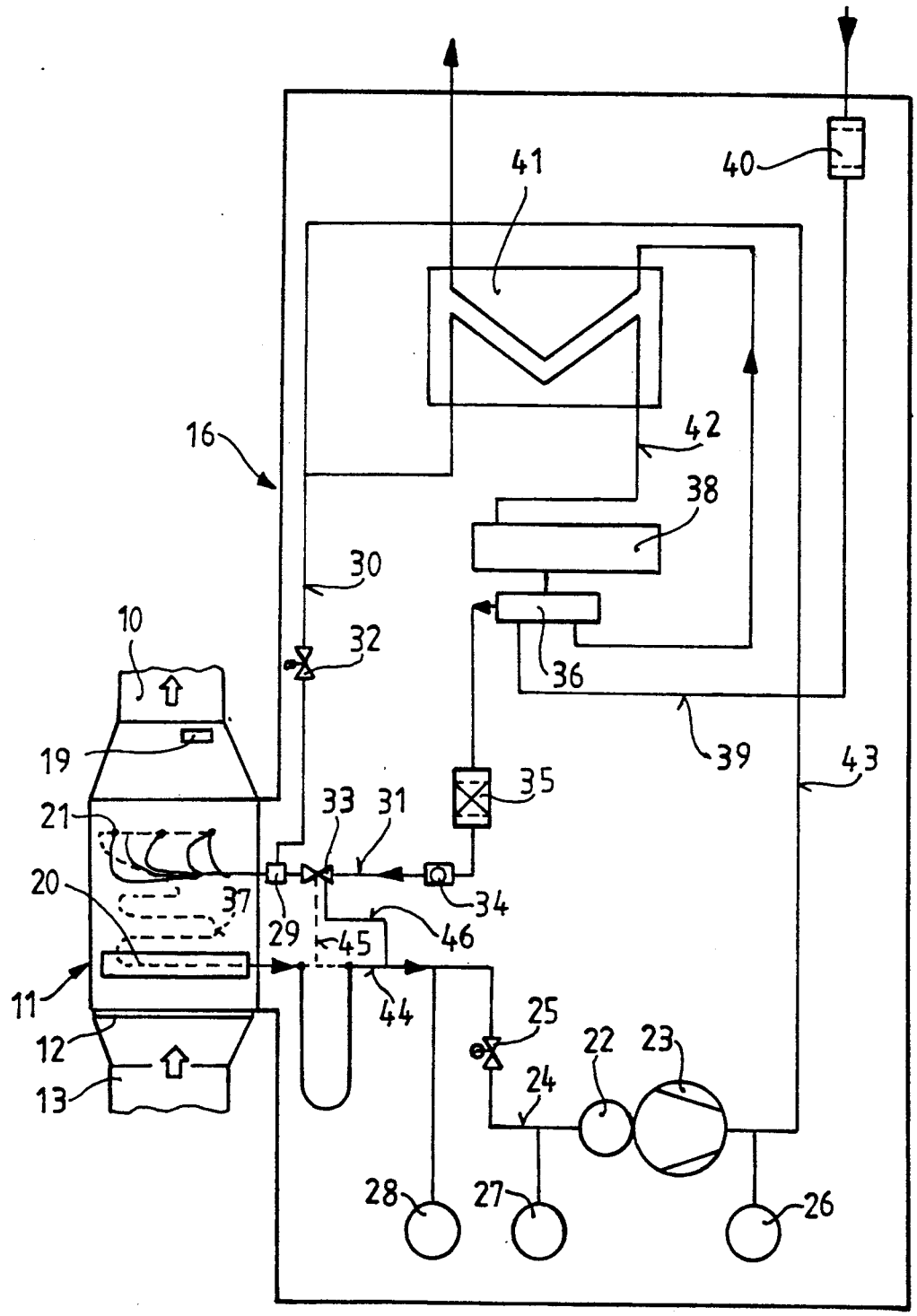
FIG. 3 shows a circuit diagram of the cooling apparatus in FIG. 2.

According to FIG. 3, the direct evaporator 11 comprises a plate in part 20 and an injection device 21 feeding into a cooling agent coil 37, which both are connected to the refrigeration plant 16. The air to be conditioned flows through the direct evaporator 11 and exchanges heat with the plates and the cooling agent gas flowing through the flow-through coil 37. A compressor 23 driven by a motor 22 operates at the outlet evaporator 11 through a conduit 24. A throttle valve 25 actuatable by a motor is located in the conduit 24; a high pressure relief device 26 and, on the low pressure side, a pressure keeper 27 effective at too high pressure and a pressure keeper 28 effective at too low pressure are connected to the conduit 24. The supply to the injection device 21 is regulated by a hot gas intermixer 29, to which on the one hand a conduit 30 for hot cooling agent and on the other hand, a conduit 31 for cold cooling agent liquid are connected. The conduit 30 for hot cooling agent gas leads to an interconnecting line 43 through a controllable magnetic valve 32, wherein the flow quantity of a cooling agent gas can be controlled by the magnetic valve 32. A thermal expansion valve 33 is located in the conduit 31 for the cooling agent liquid, by means of which the flow-through quantity of cooling agent liquid can be regulated. The conduit 31 for the cold cooling agent liquid emanates from a supercooler 36 and passes through a sight glass 34 and a drier 35. The supercooler 36 is fed by a collector 38. A The supercooler 36 is fed by a collector 38. A cooling water circuit 39 is connected to the supercooler 36, which circuit comprises a dirt trap 40 and passes through a liquifier 41 through which a connector line 42 between the collector 38 and the connector line 43 for the cooling agent also passes.

Water at a temperature of 12°–20° C. flows into the cooling water circulation circuit and water of 18°–26° C. flows out of it. A thermocouple 44 is provided in the conduit 24 which acts upon valve 33 through an electrical control line 42. Furthermore, a compensation line 46 is provided between the conduit 31 an the conduit 24. The regulation device 17 controls the three valves 32, 33 and 25 through electrical control lines, which are not shown here, in order to the actual or feedback value continuously to the nominal value. In order to render the regulation even more sensitive, the hot gas intermixer 29 having an adjustable design is connected to the regulation device 17 through an electrical control line.

We claim:

1. A blow extruder for producing hoses from plastic materials, comprising:

annular nozzle means for producing a plastic hose;

means for delivering plastic material to said annular nozzle means;

means arranged coaxially with said annular nozzle means for supplying internal air for the hose;

a cooling air nozzle ring arranged coaxially with said annular nozzle ring and encompassing the hose for cooling same;

a blower for supplying air to said cooling air nozzle ring;

a conduit means for delivering air from said blower to said cooling air nozzle ring;

a cooling means arranged in said conduit means for cooling the air flowing through said conduit means, said cooling means including a direct evaporator provided with a refrigeration plant and arranged between said blower and said cooing air nozzle ring, said direct evaporator having an inlet and an outlet and including a plate fin element and an injection means for a cooling agent and a hot gas, said cooling means further including a compressor arranged at said evaporator outlet, an admixture conduit for the cooling agent and hot gas, and three control valves arranged, respectively, at said inlet of said direct evaporator, between said direct evaporator and said compressor, and in said admixture conduit; and a regulation means for automatically regulating temperature of cooing air to a set constant temperature, in accordance with set value/actual value comparison based on a measurement of the cooling air temperature, by controlling operation of said three valves.

2. A blow extruder as set forth in claim 1, wherein said blower is provided with a means for aspirating environmental air, and said extruder further comprises a filter for cleaning the air delivered to said cooling air nozzle ring.

3. A blow extruder as set forth in claim 1, wherein said direct evaporator does not include any ventilators.

* * * * *